United States Patent [19]
Kawasaki

[11] Patent Number: 5,492,388
[45] Date of Patent: Feb. 20, 1996

[54] STRUCTURE FOR STEERING MEMBER

[75] Inventor: Yoshiki Kawasaki, Atsugi, Japan

[73] Assignee: Nissan Motor Co., Ltd., Yokohama, Japan

[21] Appl. No.: 168,309

[22] Filed: Dec. 17, 1993

[30] Foreign Application Priority Data

Dec. 28, 1992 [JP] Japan ..................... 4-358637

[51] Int. Cl.⁶ .................................. B60R 27/00
[52] U.S. Cl. ..................... 296/194; 411/427; 411/535
[58] Field of Search .................... 296/194, 203; 280/779; 411/427, 429, 535, 536, 403

[56] References Cited

U.S. PATENT DOCUMENTS

| | | | |
|---|---|---|---|
| 4,453,346 | 6/1984 | Powell et al. | 411/535 |
| 4,671,536 | 6/1987 | Yoshimura | 280/779 |
| 5,238,286 | 8/1993 | Tanaka et al. | 280/779 |
| 5,282,637 | 2/1994 | McCreadie | 296/203 |
| 5,340,258 | 8/1994 | Simon | 411/535 |

FOREIGN PATENT DOCUMENTS

| | | | |
|---|---|---|---|
| 64853 | 10/1946 | Denmark | 411/427 |
| 62-127859 | 8/1987 | Japan | |
| 112288 | 5/1988 | Japan | 296/194 |
| 406156315A | 6/1994 | Japan | 280/779 |

*Primary Examiner*—David M. Mitchell
*Assistant Examiner*—Gary C. Hoge
*Attorney, Agent, or Firm*—Lowe, Price, LeBlanc & Becker

[57] ABSTRACT

A structure for a vehicle includes left and right side members such as left and right front pillars, and a cross member, such as a steering member, which extends laterally between the side members, and which has left and right ends, respectively, fastened to the left and right side members. The structure further includes an adjusting screw member which is mounted on one end of the cross member for adjusting the total length of the cross member so as to fit between the left and right side members. The adjusting operation is done by rotating the adjusting screw member in an unscrewing direction to increase the length until the screw member abuts on the adjacent side member, and the adjustable end of the cross member is fastened to this side member by a screw fastener. The adjusting screw member is formed with an engagement hole or socket for receiving a tool for torquing the screw member. Therefore, the adjusting operation for rotating the-adjusting screw member and the fastening operation for inserting and screwing the screw fastener can be performed from the same side.

11 Claims, 12 Drawing Sheets

STRUCTURE FOR STEERING MEMBER

BACKGROUND OF THE INVENTION

The present invention relates to a structure and a method for fixing a cross member such as a steering member between two side members.

Figure 17:
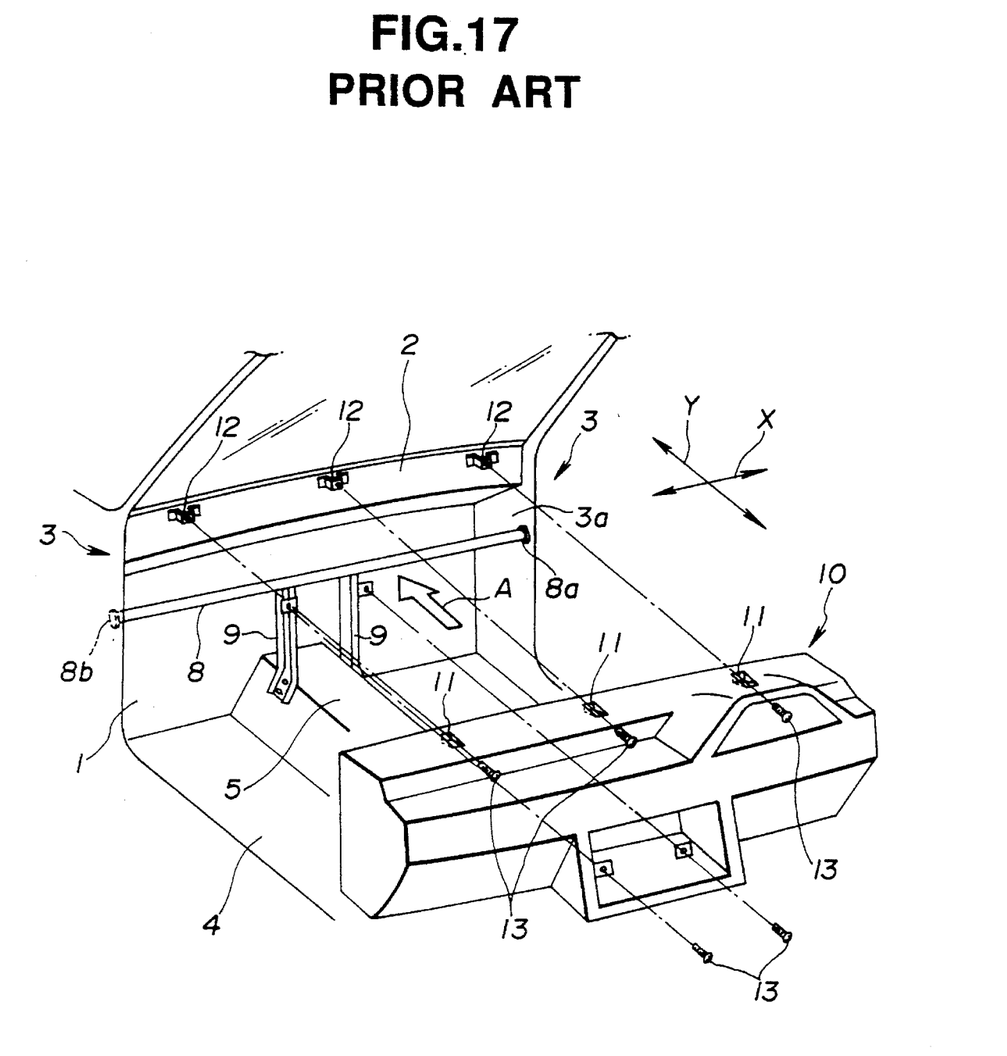
FIG. 17 is a perspective view showing a steering member in a conventional structure of a vehicle.
Figure 18:
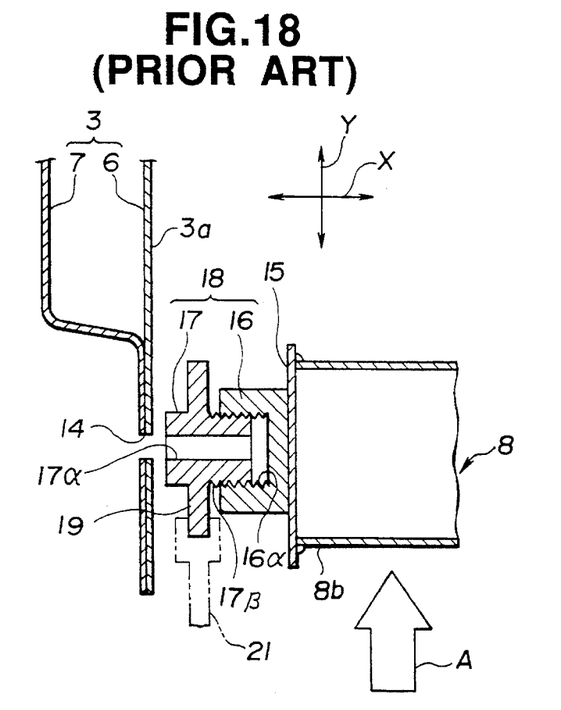
FIGS. 18 and 19 are horizontal sectional views of the left end of the steering member shown in FIG. 17 and its mount portion, for illustrating conventional adjusting and fastening operations.
Figure 19:
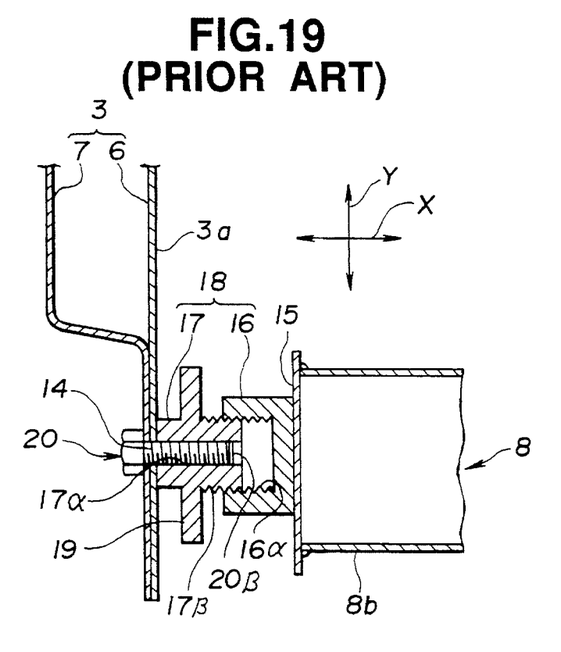

One conventional structure is shown in FIGS. 17–19. (A similar structure is disclosed in Japanese Utility Model Provisional Publication (Shou) 62-127859.)

The vehicle body shown in FIG. 17 includes a dash lower panel 1, a dash upper panel 2, left and right front pillars 3, a floor panel 4, a floor tunnel 5, etc. Between the left and right front pillars 3, a steering member 8 extends in a lateral (or widthwise) direction X of the vehicle. The steering member 8 is fixed to the left and right front pillars 3, and further fixed, through two stays 9, to the floor tunnel 5. An instrument panel 10 has a plurality of fastening portions 11 each having a fastener hole. A plurality of mounting brackets 12 are fixed to the dash upper panel 2 and the stays 9. The instrument panel 10 is fastened, by a plurality of screw fasteners 13, to the mounting brackets 12.

The steering member 8 is fixed at both ends 8a and 8b to the front pillars 3 in the following manner. The stays 9 are preliminarily fixed to the steering member 8. The subassembly of the steering member 8 and the stays 9 is moved in a direction shown by an arrow A in FIG. 17 along a longitudinal direction Y of the vehicle, and set in a predetermined position between the left and right front pillars 3. Then, the right end 8a of the steering member 8 is fastened to the right front pillar 3 by a bolt inserted through a bolt hole formed in the right front pillar 3.

The steering member 8 has an end bracket 15 closing an open left end of the steering member 8 which is hollow. An adjusting means 18 for adjusting the length of the steering member 8 is attached to the end bracket 15. The adjusting means 18 consists of an adjust nut 16 and an adjust bolt 17. This adjusting means 18 makes adjustable the length between the right end 8a of the steering member 8 and the left end of the adjust bolt 17. The steering member 8 with the adjusting means 18 can be precisely fitted between the left and right front pillars even if there is an error in the distance between the left and right pillars 3. In the assembly process of automotive vehicles, in general, the spacing between the left and right front pillars 3 is not completely uniform from product to product. The adjusting means 18 is required to compensate for variations in the distance between the left and right pillars 3.

The adjust nut 16 of the adjusting means 18 is fixed to the end bracket 15 of the steering member 8, and formed with an internally threaded portion 16α opening to the left. The adjust bolt 17 has an externally threaded portion 17β which is screwed into the internally threaded portion 16α of the adjust nut 16. The adjust bolt 17 further has a pair of lever arms 19 projecting outwards. The adjust bolt 17 is further formed with an internally threaded portion 17α defining a threaded through hole pasting through the adjust bolt 17. A fastening bolt 20 has a threaded portion 20β which is screwed into the internally threaded portion 17α of the adjust bolt 17 in the state shown in FIG. 19.

The adjust bolt 17 is first screwed deeply into the adjust nut 16, as shown in FIG. 18. In this state in which the total length of the steering member 8 and the adjusting means 18 is made smaller, it is easier to insert and set the steering member 8 with the adjusting means 18 between the left and right front pillars 3. Then, the right end 8a of the steering member 8 is fastened to the right front pillar 3. In this state, a gap is left between the adjust bolt 17 and the inside surface 3a of the left front pillar 3, as shown in FIG. 18. Therefore, a tool 21 is inserted in the direction shown by an arrow A in FIG. 18 along the longitudinal direction Y of the vehicle between the steering member 8 and the left front pillar 3, to catch one of the lever arms 19 of the adjust bolt 17 and rotate the adjust bolt 17 in an unscrewing direction. This rotation causes the adjust bolt 17 to move to the left, and the rotation is continued until the adjust bolt 17 abuts against the inside surface 3a of the left front pillar 3. Thereafter, the bolt 20 is inserted, along the lateral direction X of the vehicle, through a bolt hole 14 formed in the left front pillar 3, and tightened into the internally threaded portion 17α of the adjust bolt 17, as shown in FIG. 19. In this state, the steering member 8 is accurately fit between the left and right front pillars 3 with no gap left, and both ends are firmly fastened.

In this conventional structure, however, the adjusting operation of rotating the adjust bolt 17 must be performed along the longitudinal direction Y from the rear side whereas the fastening operation of inserting and screwing the bolt 20 must be done along the lateral direction X. The operator must change the position and attitude. Furthermore, the adjusting operation must be done in the limited narrow space between the front pillar 3 and the bracket 15.

SUMMARY OF THE INVENTION

It is an object of the present invention to provide a vehicle structure which facilitates an assembling process or which makes it possible to perform adjusting operation and fastening operation of a cross member from the same side.

A vehicle structure according to the present invention comprises:

- a first side assembly comprising a first mount portion, and a second side assembly comprising a second side mount portion which is formed with a fastener hole; and
- an adjustable cross assembly which extends from a first end to a second end along a lateral direction of the vehicle and which is connected between the first and second side assemblies.

In this structure, the first end of the adjustable cross assembly is fixed to the first side mount portion of the first side assembly; the second end of the adjustable cross assembly comprises an internally threaded fastening portion and is fastened to the second side mount portion of the second side assembly by a screw fastener which is inserted through the fastener hole of the second side mount portion and screwed into the internally threaded fastening portion of the adjustable cross assembly; and the adjustable cross assembly comprises a cross member and a movable adjusting screw member for adjusting a length of the adjustable cross assembly between the first and second ends of the adjustable cross assembly. The cross member comprises a first end defining the first end of the adjustable cross assembly and a second end which confronts the second side assembly and which comprises a threaded adjusting portion. The movable adjusting screw member comprises a threaded adjusting portion engaging with the threaded adjusting portion of the cross member so as to form a bolted joint, and a noncircular engagement socket through which the screw fastener passes.

In illustrated examples according to the present invention, the first (right) side assembly comprises at least a right front pillar; the second (left) side assembly comprises at least a left front pillar, and the cross member of the adjustable cross assembly comprises at least a steering member.

DETAILED DESCRIPTION OF THE INVENTION

FIGS. 1–5 show a first practical example according to the present invention.

Figure 1:
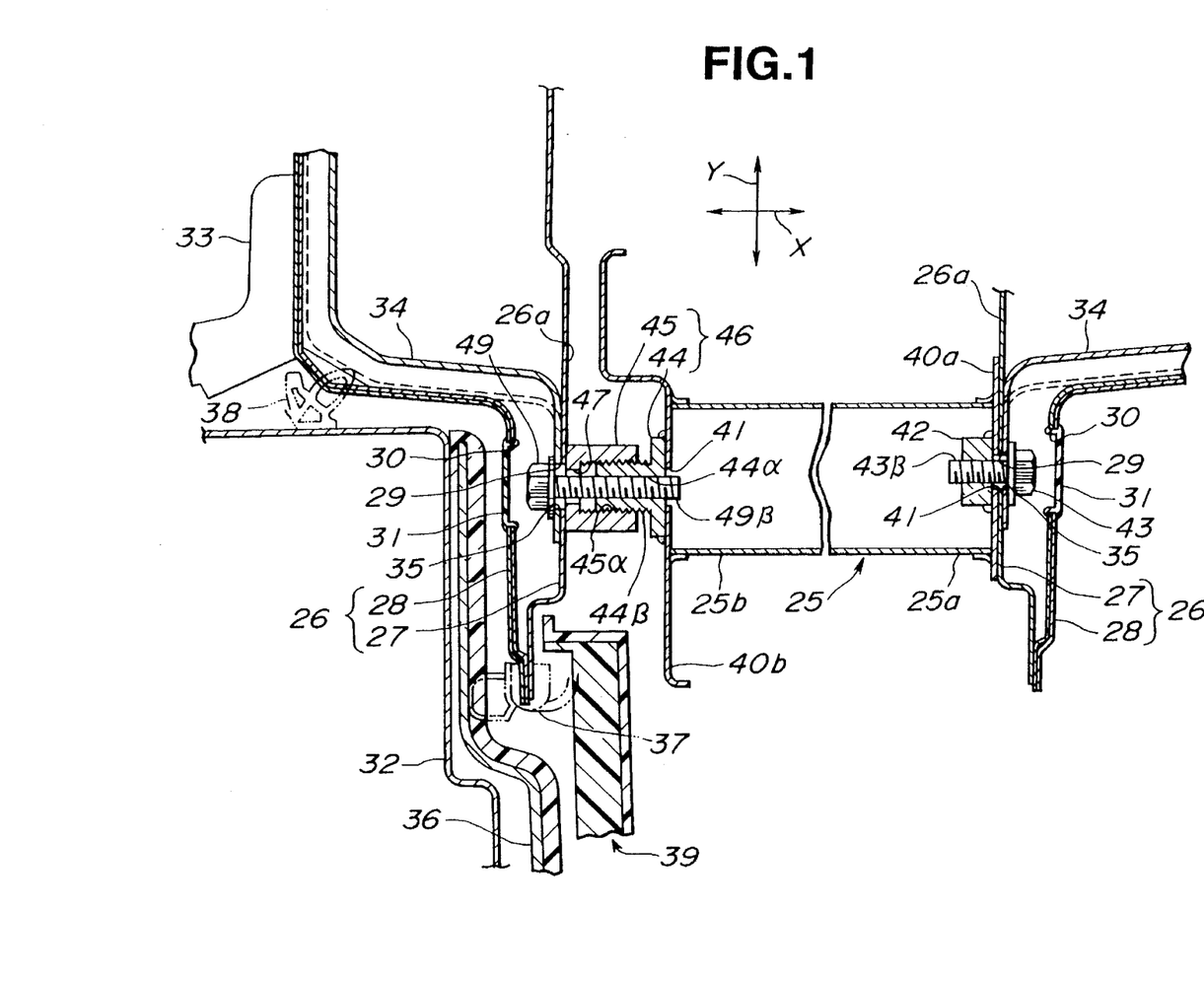
FIG. 1 is a horizontal sectional view showing a mounting structure for a steering member of a first practical example according to the present invention.
Figure 2:
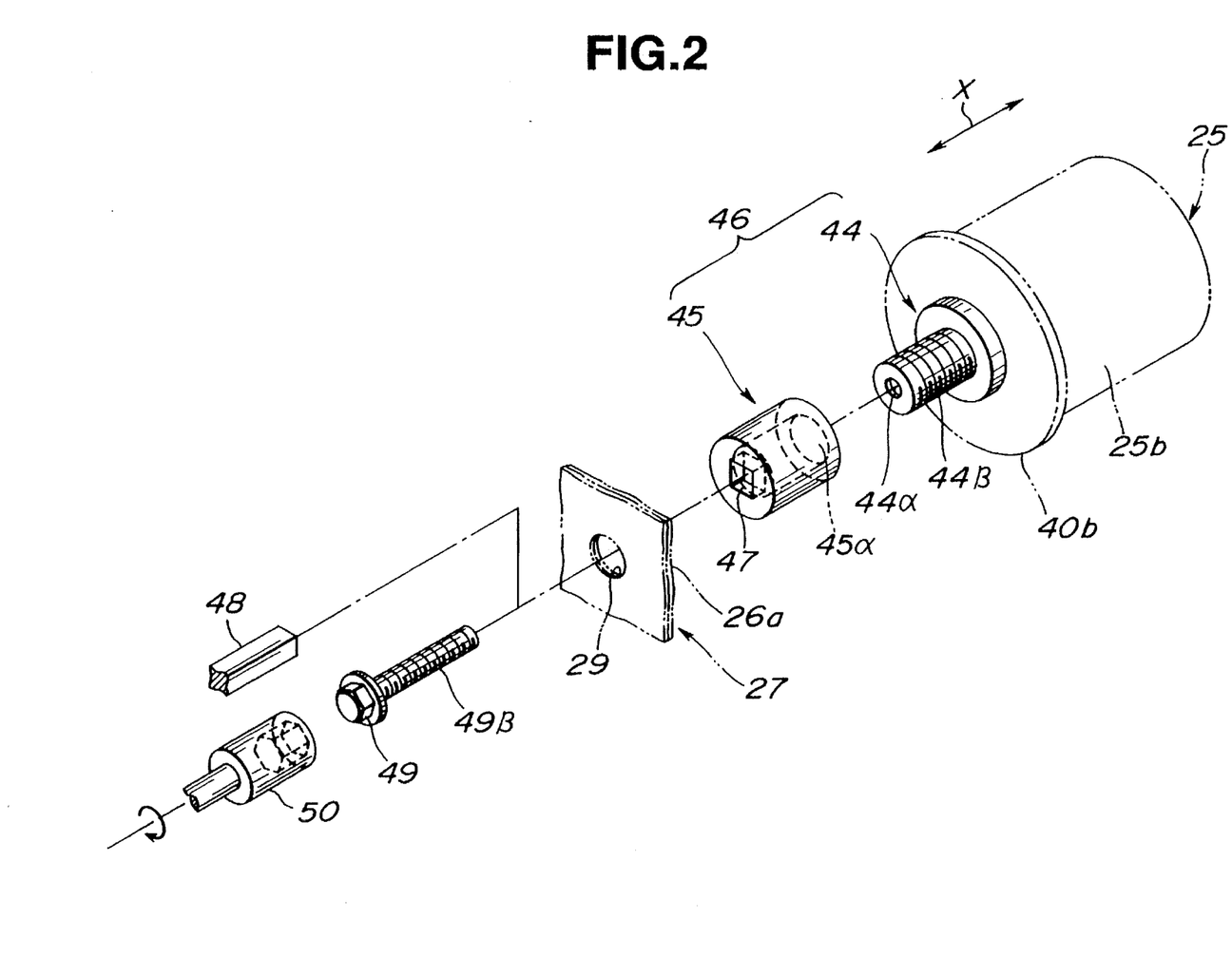
FIG. 2 is an exploded perspective view showing a left side mounting portion of the structure of the first example.

A structure for a vehicle shown in FIG. 1 includes a right side assembly comprising a right side member having a mount portion, a left side assembly comprising a left side member having a mount portion, and an adjustable cross assembly connected between the right and left side members of the right and left side assemblies. In this example, the right side assembly comprises a right front pillar 26, the left side assembly comprises a left front pillar 26, and the adjustable cross member comprises a cross member composed of a steering member 25 and a stationary adjusting screw member 44 fixed to the left end of the steering member 25, and a movable adjusting screw member 45. The stationary and movable adjusting screw members 44 and 45 constitute an adjusting means 46.

Each of the front pillars 26 is composed of an inner pillar panel 27 and an outer pillar panel 28. In this example, the outer pillar 28 of each pillar 26 is a dual panel having two layers. In each pillar 26, the inner panel 27 has a mount portion formed with a fastener hole 29, and the outer panel 28 is formed with an access hole 30 confronting the fastener hole 29. In this example, both holes 29 and 30 are circular, and the diameter of the access hole 30 is larger than the diameter of the fastener hole 29. The centers of the fastener hole 29 and the access hole 30 are aligned along the lateral direction X. The mount portion of the inner panel 27 of each pillar 26 is substantially flat and parallel to the longitudinal direction Y of the vehicle, and substantially perpendicular to the lateral direction X of the vehicle. The access hole 30 of each pillar 26 is closed by a cap 31. A door hinge 33 shown in FIG. 1 is fixed to the adjacent outer panel 28, which is reinforced by a brace (panel) 34. The door hinge 33 is a device for supporting a vehicle door 32. The brace 34 is joined to the inboard side of the outer panel 28. The brace 34 has an inner portion which is formed with a circular fastener hole 35 corresponding to the fastener hole 29 of the inner panel 27, and which is joined with the mount portion of the inner panel 27 so that the fastener holes 29 and 35 are superimposed congruently to form a single continuous hole. In this way, the brace 34 reinforces the mount portion of the inner panel 27, and improves the rigidity of the front pillar 26 by connecting the inner and outer panels 27 and 28. The structure shown in FIG. 1 further has a door trim 36, and weather strips 37 and 38. One end of an instrument panel 39 is also shown in FIG. 1.

The steering member 25 which, in this example, a hollow round bar, extends along the lateral (widthwise) direction X of the vehicle, and has right and left ends 25a and 25b. An end bracket 40a is fixed to the right end 25a of the steering member 25 and closes the opening of the right end 25a. The end bracket 40a is formed with a fastener hole 41 which, in the state of FIG. 1, confronts the fastener hole 29 of the right front pillar 26. A weld nut 42 is joined to the inner side of the end bracket 40a at such a position that the center hole of the weld nut 42 is fully open in the fastener hole 41. The right end 25a of the steering member 25 is first set at a predetermined position confronting the fastener hole 29 of the right front pillar 26. Then a threaded shank 43β of a bolt 43 is inserted into the fastener holes 29 and 41 through the access hole 30, and screwed into the weld nut 42. In this way, the right end 25a of the steering member 25 is held in tight contact with the inboard surface 26a of the right front pillar 26 and firmly fixed to the right front pillar 26. Thereafter, the right access hole 30 is closed by the cap 31.

The adjusting means 46 of this example is provided at the left end 25b of the steering member 25. The adjusting means 46 of this example includes the stationary adjusting screw member in the form of an adjust bolt 44, and the movable adjusting screw member in the form of an adjust nut 45. The adjust bolt 44 is fixed to the outer (left) side of a left end bracket 40b which is fixed to the left end 25b of the steering member 25 so as to close the opening of the left end 25a. The left end bracket 40b is formed with a central hole 41 centered in the opening of the left end 25b of the steering member 25. The adjust bolt 44 is aligned with the hole 41, and welded to the left end bracket 40b. The adjust bolt 44 has an externally threaded portion 44β and an internally threaded portion 44α defining an internally threaded hole passing through the adjust nut 44 from one end to the other. The adjust nut 45 of this example is cylindrical, and has an internally threaded portion 45α and an end portion formed with an engagement hole 47. The internally threaded portion 45α of the adjust nut 45 defines a central threaded hole which is open at the right end and which is terminated at the left end by the end portion. The engagement hole 47 opens in the left end of the central threaded hole of the adjust nut 45. The internally threaded portion 45α of the adjust nut 45 is screwed over the externally threaded portion 44β of the adjust bolt 44.

Figure 3:
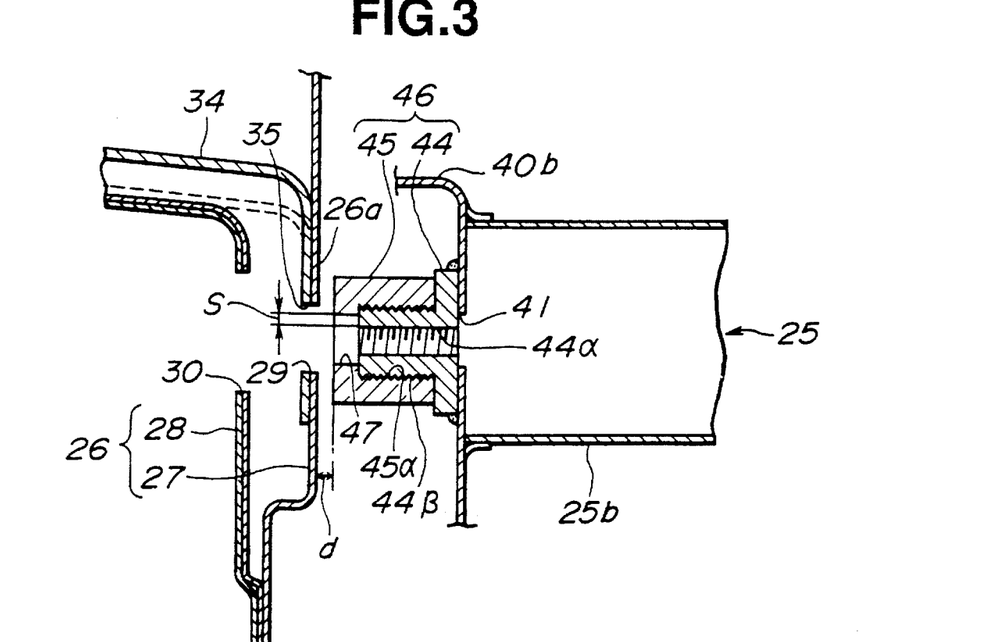
FIGS. 3, 4 and 5 are horizontal sectional views showing adjusting and fastening operations of the structure shown in FIG. 1.

The engagement hole 47 of this example has a cross sectional shape of a square which is circumscribed by an imaginary outer circle having an outer diameter, and inscribed by an imaginary inner circle. The inner circle is concentric with the outer circle and has an inner diameter smaller than the outer diameter. The inner diameter of the engagement hole 47 is greater than the diameter of the internally threaded portion 44α. Therefore, there is formed a step S between the engagement hole 47 and the internally threaded portion 44α of the adjust bolt 44, as shown in FIG. 3. Furthermore, the diameter of the circular fastener hole 29 is greater than the outer diameter of the engagement hole 47. In this example, the cross member is constituted by the steering member 25, the end brackets 40a and 40b and the adjust bolt 44.

The steering member 25 is fastened to the left and right front pillars 26 in the following manner. First, the adjust nut 45 is moved to the right by rotation in the screwing direction until the adjust bolt 44 is screwed deep into the adjust nut 45, and the length of the adjusting means 46 is reduced to the limit as shown in FIG. 3. With the adjusting means 46 in this shortened state, the steering member 25 is set between the left and right front pillars 26, and the right end 25a of the steering member 25 is fastened to the right front pillar by the bolt 43 as mentioned before. The adjusting means 46 in the shortened state facilitates the setting of the steering member 25. In this state, a gap d is left between the inboard surface 26a of the left front pillar 26 and the left end of the adjust nut 45, as shown in FIG. 3.

Figure 4:
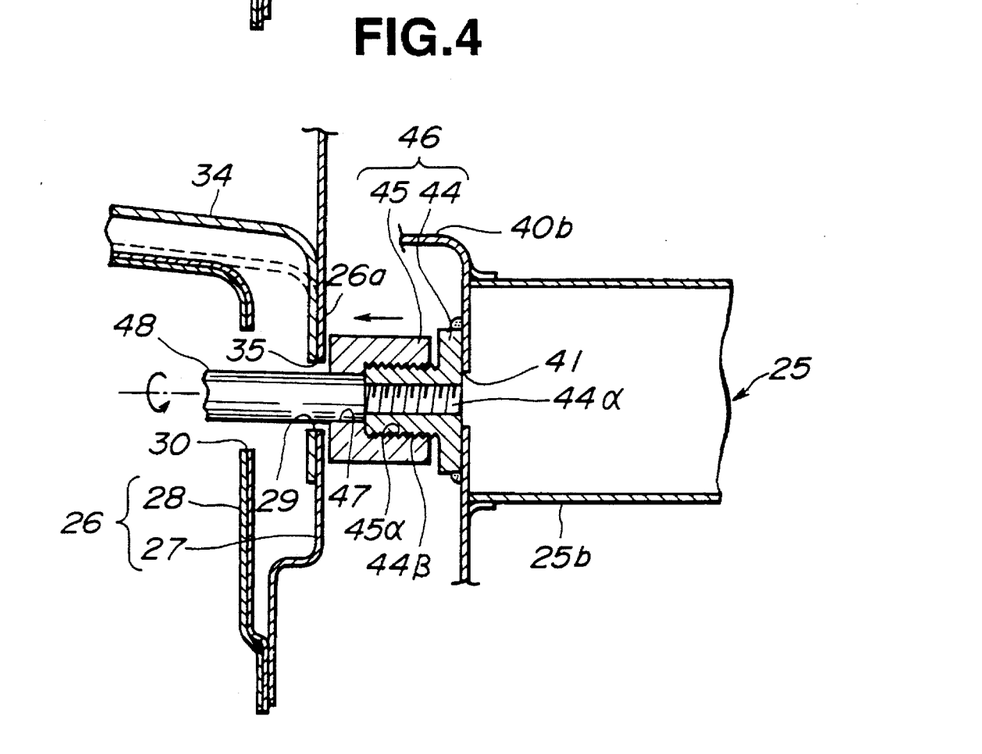

In order to eliminate this gap d, a square wrench 48 is inserted, along the lateral direction X, through the access hole 30 and the fastener hole 29 into the square engagement hole 47 of the adjust nut 45, as shown in FIG. 4. The fastener hole 29 is larger in cross sectional size than the engagement hole 47, and accordingly the fastener hole 29 readily allows the insertion of the square wrench 48. Because of the step S, the tip of the wrench 48 abuts against the end surface of the adjust bolt 44. Therefore, the wrench 48 can be readily set in the correct position. The square wrench 48 (or square Allen wrench) has a square rod portion which can be fit in the square engagement hole 47, and makes it possible to torque the adjust nut 45. With this square wrench 48 fit in the square engagement hole 47, the adjust nut 45 is rotated in the unscrewing direction. This rotation causes the adjust nut 45 to move to the left and increases the length of the adjusting means 46. The adjust nut 45 is moved to the left until the adjust nut 45 abuts against the inner surface 26a of the left front pillar 26, and the gap d is eliminated.

Figure 5:
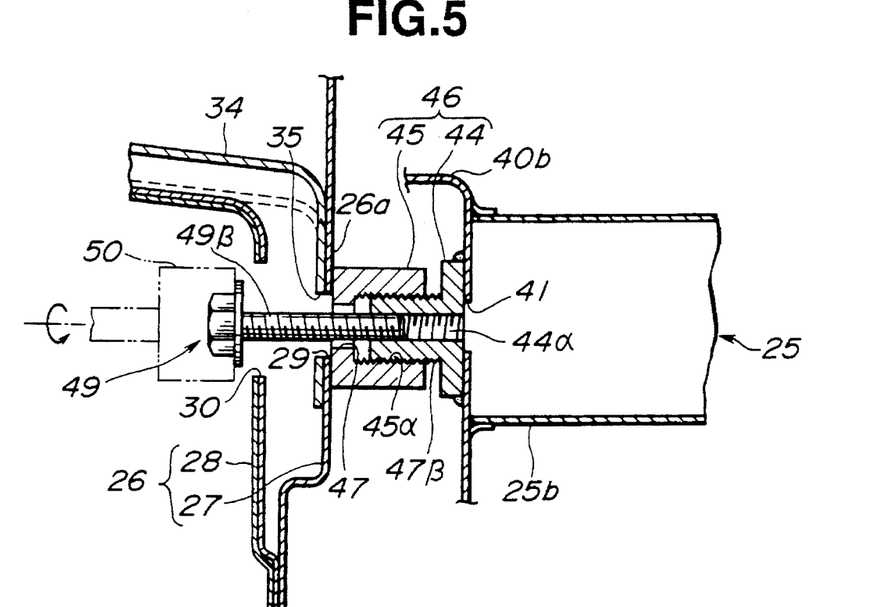

Thereafter, the square wrench 48 is removed, and instead a fastening bolt 49 having a threaded portion 49B is inserted along the lateral direction X through the access hole 30, the fastener hole 29 and the square engagement hole 47, and screwed into the internally threaded portion 44α of the adjust bolt 44, as shown in FIG. 5. The insertion of the bolt 49 through the engagement hole 47 is easy and smooth because the inner diameter of the engagement hole 47 is equal to or greater than the inside diameter of the internally threaded portion 44α of the adjust bolt 44. Then, by using a tool 50, the bolt 49 is screwed and tightened into the adjust bolt 44. The tool 50 (such as a socket wrench) of this example has a, socket fit over the head of the bolt 49 as shown in FIG. 5. Finally, the access hole 30 is closed by the cap 31, as shown in FIG. 1. In this structure, the adjusting operation for rotating the adjust nut 44 and the fastening operation for inserting and tightening the bolt 49 are both performed along the lateral direction from one side. An operator can do both operations without changing the working position and attitude. The structure of this example is advantageous in operation efficiency.

Figure 6:
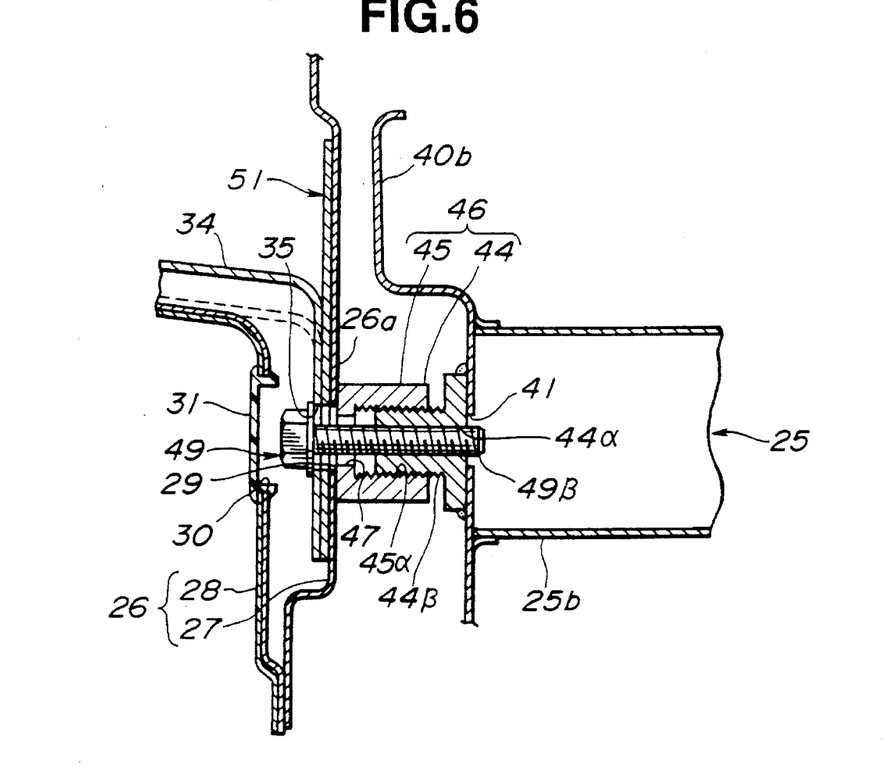
FIG. 6 is a horizontal sectional view showing a structure of a second practical example according to the present invention.

FIG. 6 shows a second practical example according to the present invention. In this example, a reinforce 51 is interposed between the inner pillar panel 27 and the brace 34, as shown in FIG. 6. In this example, the steering member 25 is supported by the mount portion having a three-layer structure of the inner panel 27, the reinforce 51 and the brace 34. This three-layer structure increases the rigidity of the mount portion defining the fastener hole 29, and enables the mount portion to reliably bear a load from the steering member 25. In other respects, the second example is the same as the first one.

Figure 7:
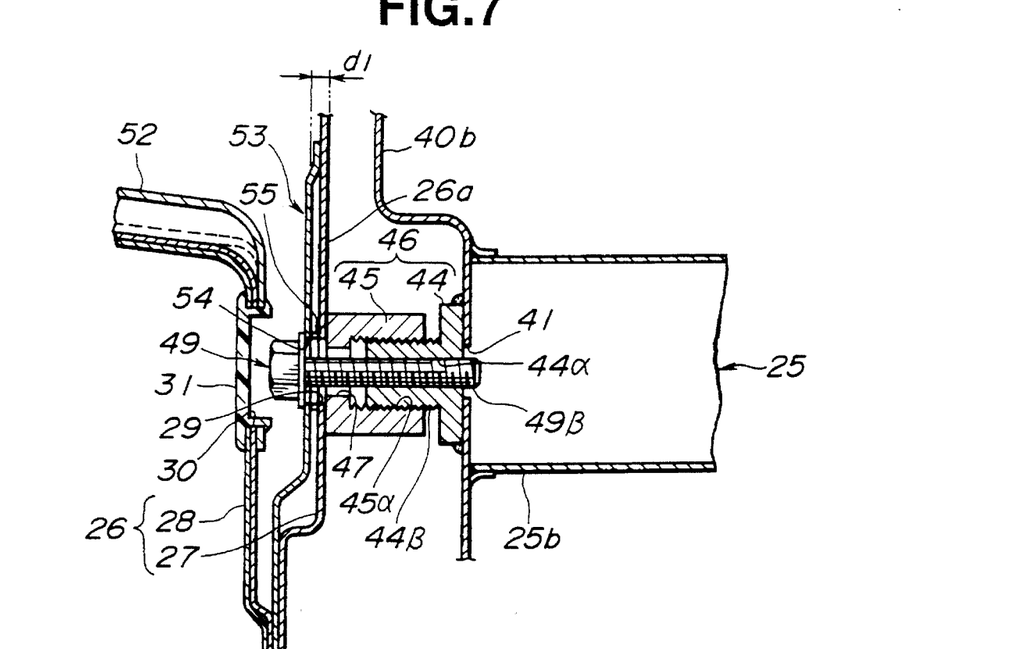
FIG. 7 is a horizontal sectional view showing a structure of a third practical example according to the present invention.

FIG. 7 shows a third practical example according to the present invention. This example employs a brace 52 which is joined only to the outer pillar panel 28, and a reinforce 53 having a front end joined to the inner pillar panel 27, a rear end which is sandwiched and joined between the inner and outer panels 27 and 28, and a middle portion which is spaced from the inner panel 27 by a distance d1 as shown in FIG. 7. The middle portion of the brace 53 is formed with a fastener hole 54 corresponding to the fastener hole 29. A (short) collar (or annular spacer) 55 is clamped between the middle portion of the brace 53 and the mount portion of the inner panel 27. The fastener holes 29, 54 and the collar 55 define a single continuous hole through which the shank of the bolt 49 is inserted and screwed into the internally threaded portion 44α of the adjust bolt 44. The reinforce 53 improves the rigidity of the front pillar 26. This mount structure having the two fastener holes 29 and 54 supporting the bolt 49 can more reliably bear the load of the steering member 25 transmitted through the bolt 49. Furthermore, the two fastener holes 29 and 54 are separated from each other by the distance d1 along the lateral direction X. Therefore, this mount structure can efficiently resist a load acting in a direction to incline the steering member 25. The collar 55 transmits the tightening force of the bolt 49 to the inner panel 27, and provides a reliable fastening. In other respects, the third example is the same as the first practical example.

Figure 8:
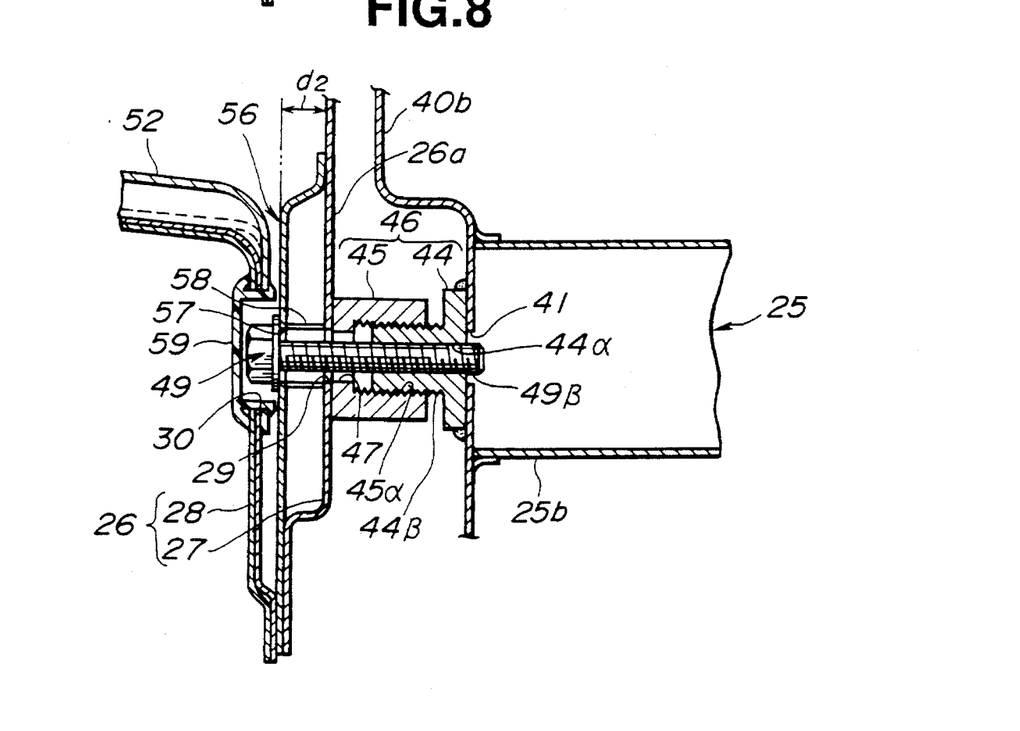
FIG. 8 is a horizontal sectional view showing a structure of a fourth practical example according to the present invention.

FIG. 8 shows a fourth practical example according to the present invention. A reinforce 56 of this example is similar to the reinforce 53 of FIG. 7. However, the distance d2 between the reinforce 56 and the inner panel 27 is made greater than d1. This reinforce 56 further improves the rigidity of the front pillar 26, and improves the resisting force against the load acting in the direction to incline the steering member 25. A long collar 58 is interposed between the reinforce 56 and the inner panel 27. The fastener hole 29 of the inner panel 27, the long collar 58 and a fastener hole 57 formed in the reinforce 56 define a single continuous hole through which the bolt 49 is inserted. The axial length of the hollow cylindrical collar 58 is greater than that of the short collar 55 of FIG. 7. The bolt 49 of this example has a relatively long shank. In the fastened state, the end of the shank slightly projects, through the hole 41 of the end bracket 40b, into the inside cavity of the steering member 25 as in the preceding examples. However, the head of the bolt 49 of the fourth example is still located in the access hole 30 of the outer panel 28 as shown in FIG. 8. Therefore, this example employs a cap 59 having a deep backside hollow for receiving the head of the bolt 49 as shown in FIG. 8. In other respects, the fourth example is the same as the third example.

Figure 9:
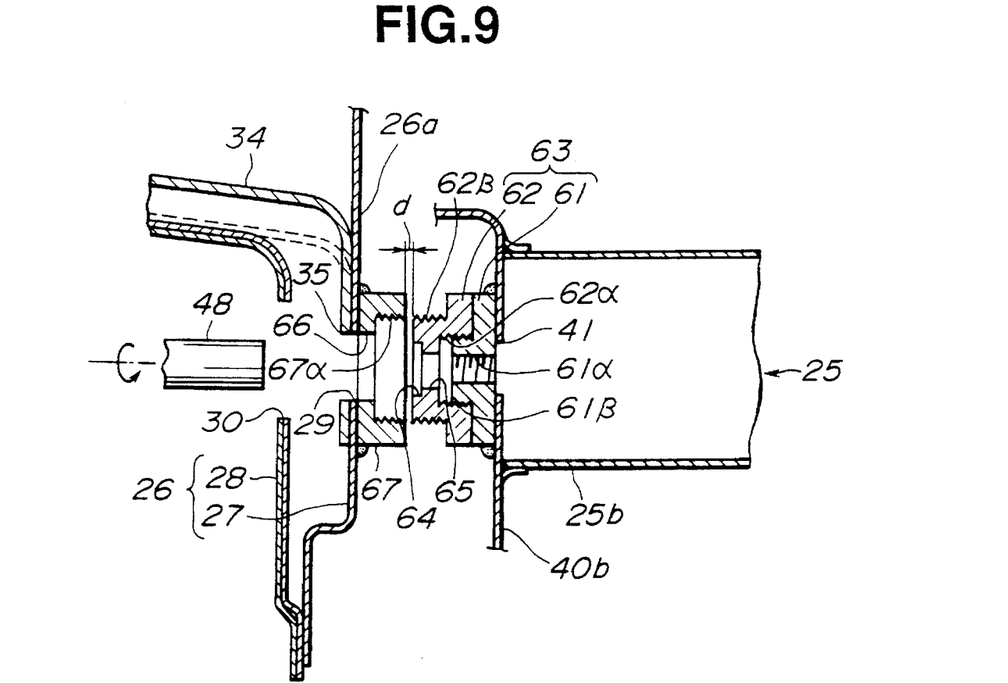
FIGS. 9 and 10 are horizontal sectional view showing a structure of a fifth practical example according to the present invention in states before and after adjusting and fastening operations.
Figure 10:
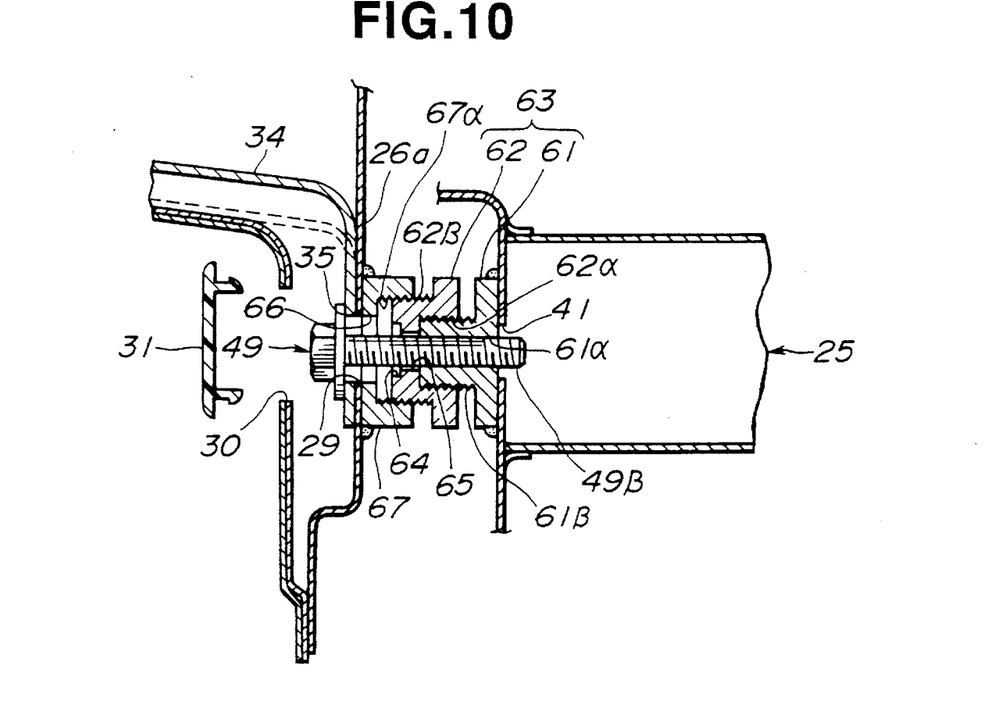

FIGS. 9 and 10 shows a fifth practical example according to the present invention. The fifth example employs a short adjusting means 63 consisting of a short adjust bolt 61 and a short adjust nut, and a fixed nut 67 fixed to the inboard surface 26a of the left front pillar 26. The short adjust bolt and nut 61 and 62 are short in the dimension along the lateral direction X, respectively, as compared with the adjust bolt and nut 44 and 45 of the preceding examples. The short adjust nut 62 has an externally threaded portion 62β. The short adjust nut 62 is formed with a square engagement hole (or engagement socket), a connecting hole 65 and a threaded hole defined by an internally threaded portion 62α. The connecting hole 65 has a left end open in the engagement hole 64, and a right end open in the threaded hole. The fixed nut 67 of this example is welded to the inner side 26a of the inner pillar panel 27. The fixed nut 67 has a through hole 66 corresponding to the fastener hole 29 of the inner panel 27, and an internally threaded portion 67α defining a threaded central hole into which the externally threaded portion 62β of the short adjust nut 62 can be screwed. The right end of the through hole 66 opens in the threaded central hole of the fixed nut 67. The engagement hole (or socket) 64 is bounded by a bottom wall. The connecting hole 65 is formed in the center of this bottom wall.

When the steering member 25 is set in the position between the left and right front pillars 26, the adjust nut 62 is deeply screwed over the adjust bolt 61 as shown in FIG. 9. When the right end of the steering member 25 is fastened to the right front pillar 26, there remains a gap d between the fixed nut 67 and the adjust nut 62, as shown in FIG. 9. Then, the square wrench 48 is inserted through the access hole 30, and the through hole 66 and the threaded hole of the fixed nut 67, and fit in the square engagement hole 64 of the short adjust nut 62. Rotation of the adjust nut 62 with the square wrench 48 in the unscrewing direction causes the adjust nut 62 to move toward the fixed nut 67, and then causes the externally threaded portion 62β of the short adjust nut 62 to screw into the internally threaded portion 67α of the fixed nut 67. Thus, the left end 25b of the steering member 25 is supported by the left front pillar 26 through the adjust bolt and nut 61 and 62 and the fixed nut 67. Then, the shank of the fastening bolt 49 is inserted though the hole 35 of the brace 34, the hole 29 of the inner panel 27, the hole 66 of the fixed nut 67, and the square hole 64 and the connecting hole of the adjust nut 62, into the internally threaded portion 61a of the adjust bolt 61. The threaded portion 49β of the fastening bolt 49 is screwed into the threaded portion 61α of the adjust bolt 61 until the fastening bolt 49 is tightened. The fixed nut 67 transmits the load from the steering member 25 through the adjust bolt and nut 61 and 62, to the inner panel 27, and by so doing, improves the rigidity of the mount structure.

Figure 11:
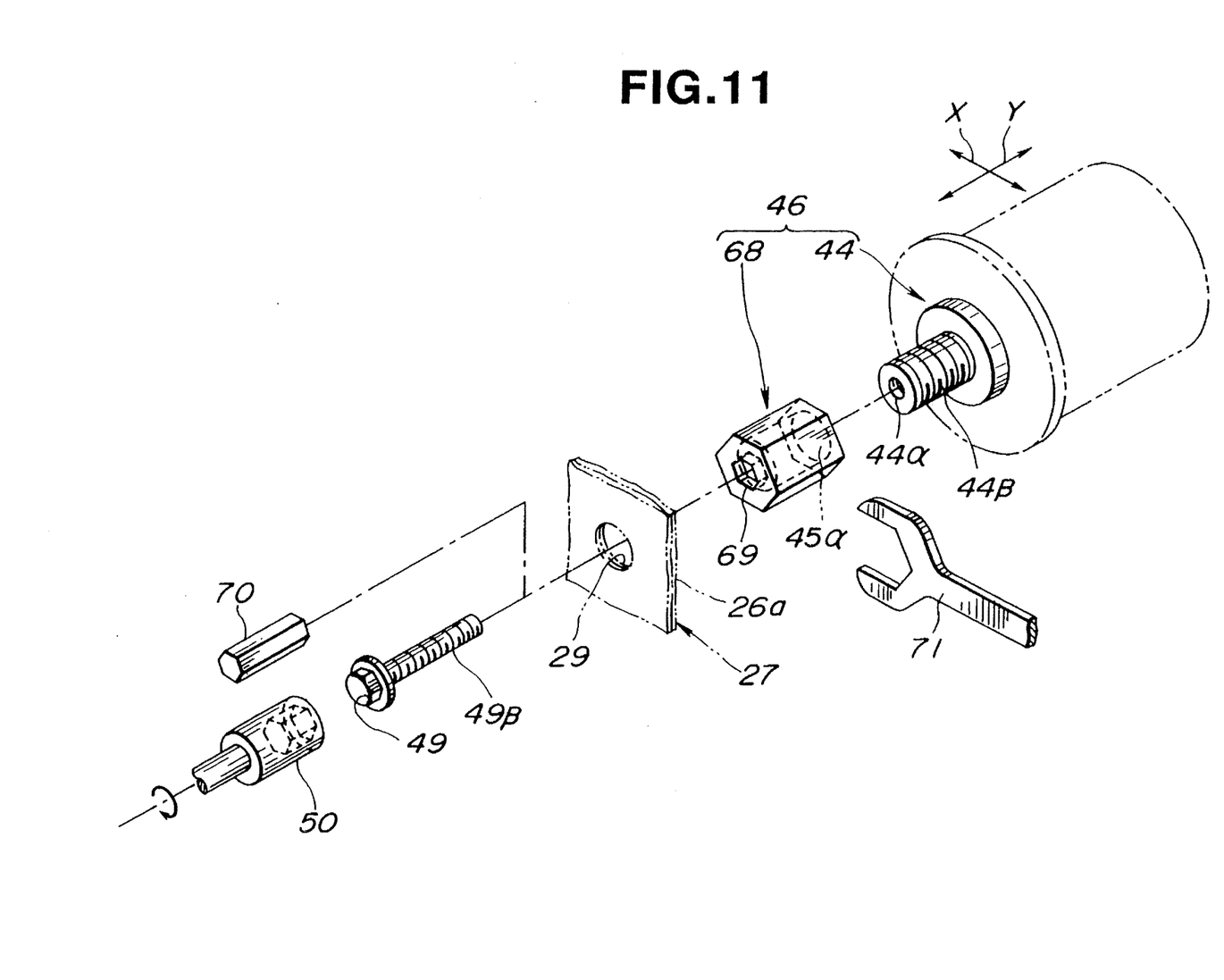
FIG. 11 is an exploded perspective view showing a mounting structure of a sixth practical example according to the present invention.

FIG. 11 shows a sixth practical example according to the present invention. This example employs a hexagonal adjust nut 68 which is shaped like a hexagonal prism. The hexagonal adjust nut 68 has a hexagonal cross section, and a hexagonal engagement hole 69 corresponding to a hexagonal wrench 70. This structure also allows the adjusting operation of torquing the adjust nut 68 and the fastening operation of torquing the fastening bolt 44 to be done in the same lateral direction as in the preceding examples. The hexagonal adjust nut 68 of the sixth example further allows a tightening operation of the hexagonal adjust nut 68 to be done along the longitudinal direction Y of the vehicle, with an open-end wrench (or spanner) 71, as shown in FIG. 11. The tightening operation with the wrench 71 can torque the adjust nut 68 with a greater tightening force.

Figure 12:
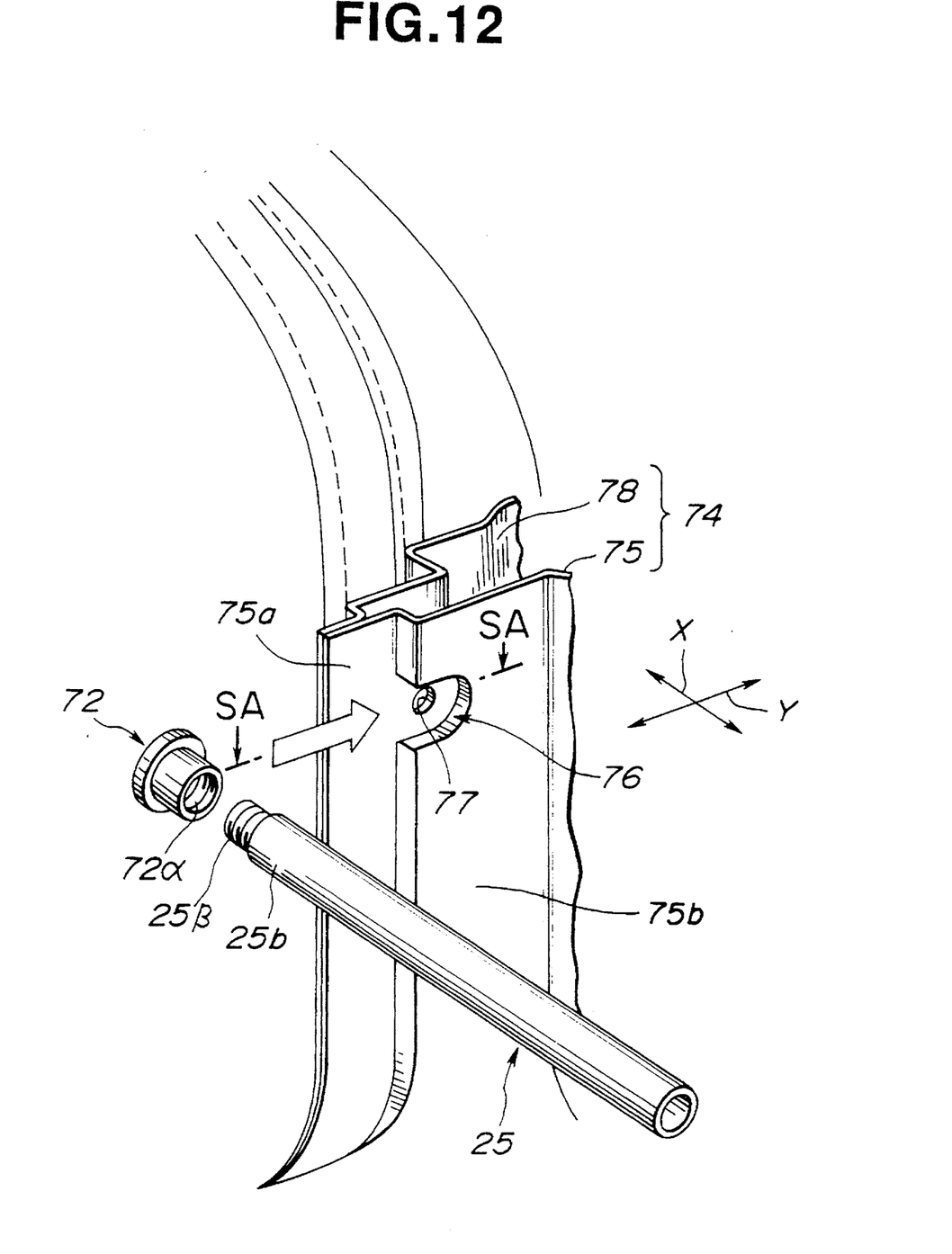
FIG. 12 is a perspective view showing a steering member and one front pillar of a structure of a seventh practical example according to the present invention.
Figure 13:
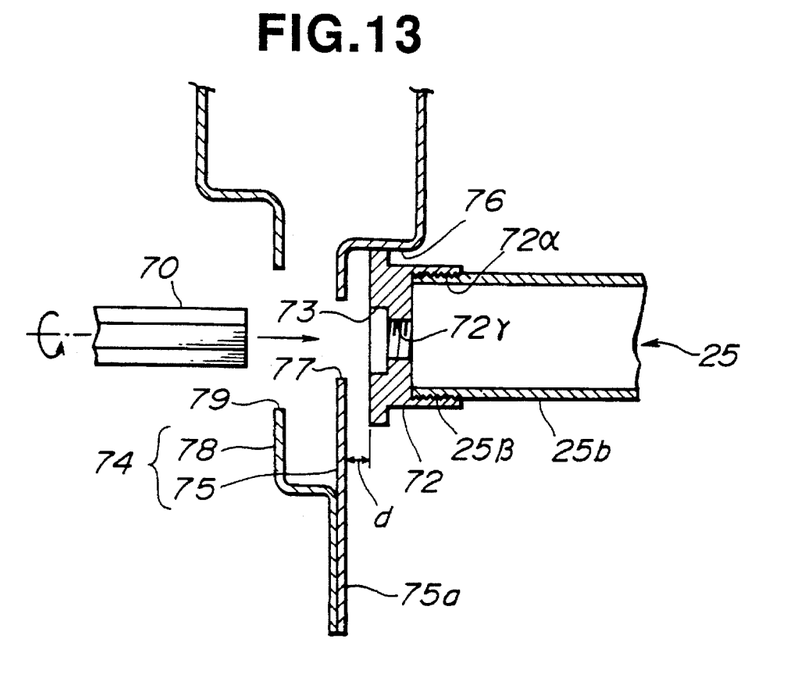
FIGS. 13 and 14 are horizontal sectional views taken across a line SA—SA in FIG. 12, for illustrating adjusting and fastening operations.
Figure 14:
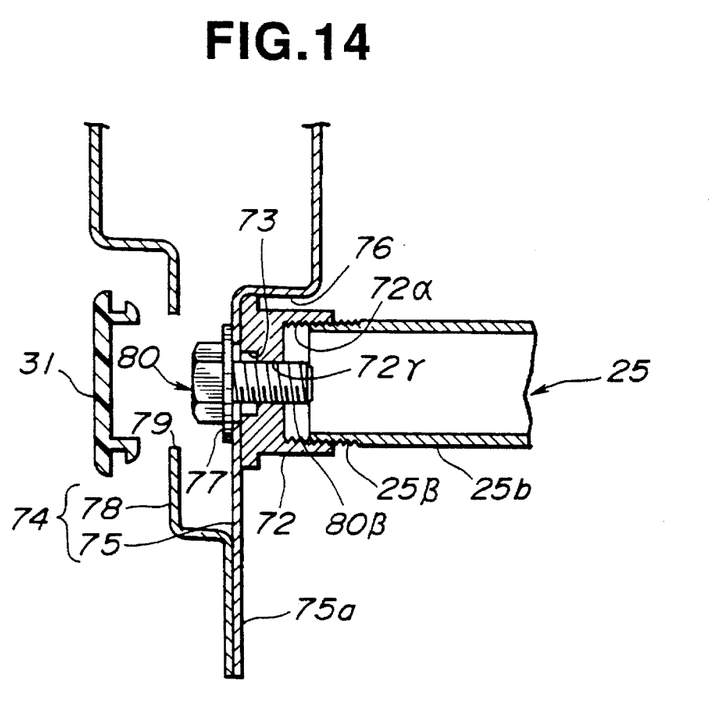

FIGS. 12~14 shows a seventh practical example according to the present invention. In this example, an adjust nut 72 is directly mounted on the left end 25b of the steering member 25. An externally threaded portion 25β is directly formed in the outside surface of the left end 25b of the steering member 25. The adjust nut 72 has an internally threaded large portion 72α which is screwed over this externally threaded portion 25β of the steering member 25. The adjust nut 72 further has a hexagonal engagement hole (or socket) 73 and an internally threaded small portion 72γ defining a threaded small central hole whose left end opens in the hexagonal engagement hole 73. The internally threaded large portion 72α defines a threaded large hole which is open to the right and which is bounded by an end wall. This end wall is formed with the engagement hole 73 and the internally threaded small portion 72γ. The right end of the threaded small hole defined by the internally threaded small portion 72γ opens in the center of the left end of the threaded large hole defined by the internally threaded large portion 72α. The left end of the threaded small hole is open in the center of the bottom of the engagement hole 73.

A front pillar 74 shown in FIG. 12 is formed with a recess 76 for receiving the adjust nut 72. The front pillar 74 is composed of inner and outer pillar panels 75 and 78 as in the preceding examples. This recess 72 is formed in the inner pillar panel 75. The recess 72 is so sized and shaped to snugly receive the adjust nut 72. The inner panel 75 is stepped, and has first and second inboard surfaces 75a and 75b between which there is formed a step. Both of the first and second inboard surfaces 75a and 75b face in the lateral direction X toward the other front pillar. The second inboard surface 75b is closer to the imaginary median plane of the vehicle which contains the longitudinal axis and vertical axis of the vehicle, than the first inboard surface 75a. That is, the first inboard surface 75a is located on the outboard side of the second inboard surface 75b. The recess 72 is depressed from the second inboard surface 75b to the first inboard surface 75a. The recess 72 is open toward the rear of the vehicle, and has a U-shaped flat bottom which is even, flush and continuous with the first inboard surface 75a, as shown in FIG. 12. A fastener hole 77 is formed in the middle of this bottom of the recess 76. The outer panel 78 is formed with an access hole 79 confronting the fastener hole 77, as shown in 13.

The recess 76 facilitates the setting operation of setting the steering member 25 between the left and right front pillars 74. The adjust nut 72 screwed around the left end 25b of the steering member 25 is inserted from the rear side of the left front pillar 74 into the recess 76. In this state, the recess 76 can determine the longitudinal position along the longitudinal direction Y and the vertical direction along the vehicle's vertical (z) axis, of the left end 25b of the steering member 25. After setting the steering member 25 in this way, the right end of the steering member 25 is fastened to the right front pillar. Then, a narrow gap d left between the adjust nut 72 and the first inboard surface 75a (i.e. the bottom of the recess 76) is removed by rotating the adjust nut 72 in the unscrewing direction with the hexagonal wrench 70 inserted into the engagement hole 73 of the adjust nut 72 along the lateral direction from the outboard side until the adjust nut 72 abuts on the first inboard surface 75a. Then, a fastening bolt 80 is inserted along the same lateral direction from the outboard side, and a threaded shank 80β of the bolt 80 is tightened into the internally threaded portion 72γ of the adjust nut 72. In this example in which the external thread 25β is formed directly on the outside surface of the steering member 25, it is possible to omit the adjust bolt (44, 61) and the left end bracket 40b, and accordingly reduce the number of component parts.

Figure 15:
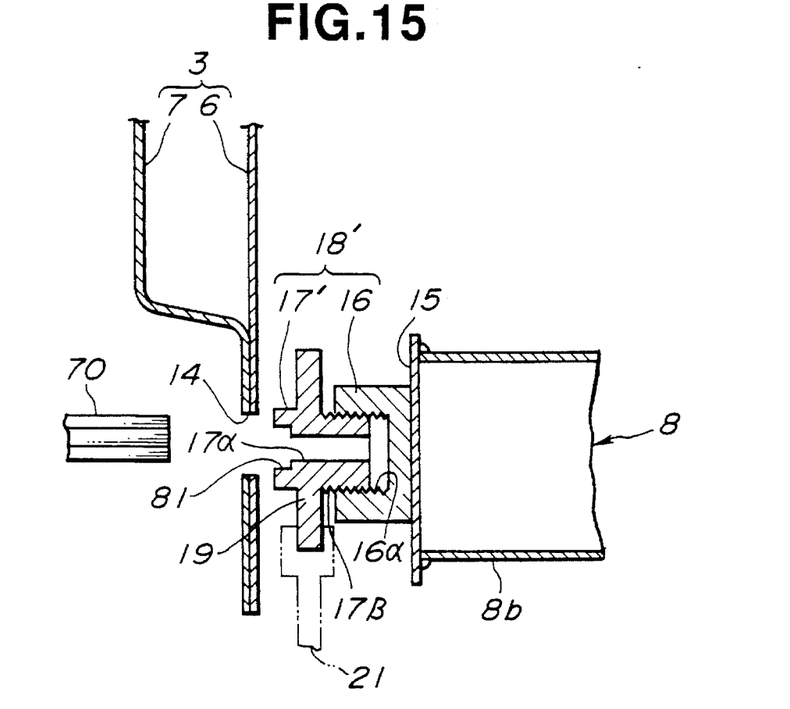
FIGS. 15 and 16 are horizontal sectional views showing a structure of an eighth practical example according to the present invention in a set state and a fastened state.
Figure 16:
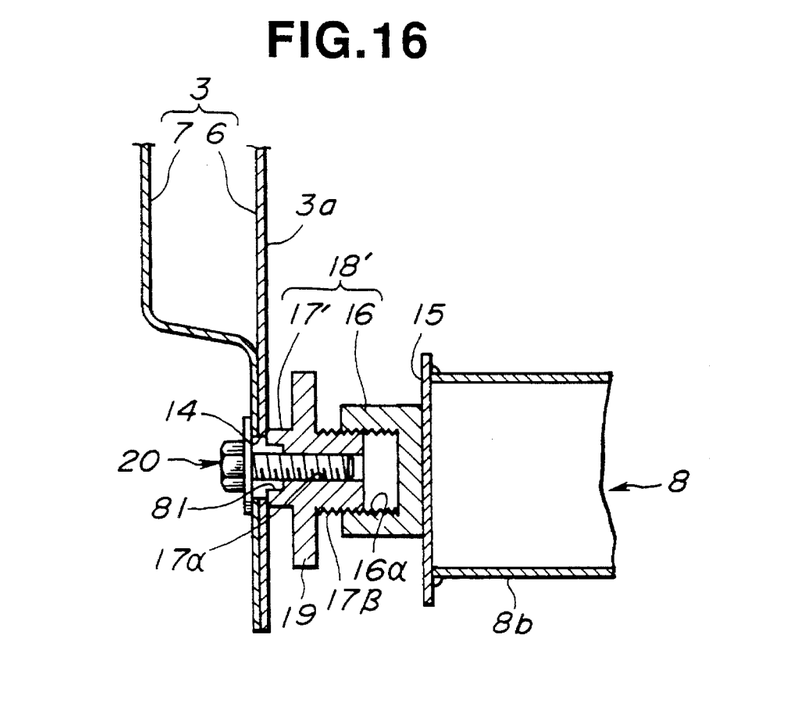

FIGS. 15 and 16 show an eighth practical example according to the present invention. In the eighth example, the conventional structure shown in FIGS. 18 and 19 is varied by adding an engagement hole 81. That is, an adjust nut 17' shown in FIG. 15 is formed with the engagement hole (or socket) 81 which is hexagonal in cross sectional shape. The left end of an internally threaded portion 17α of the adjust nut 17' is open in the center of the bottom of the hexagonal engagement hole 81. The hexagonal wrench 70 is inserted along the lateral direction X, into the hexagonal engagement hole 81, and the adjust nut 17' is rotated in the unscrewing direction until the adjust nut 17' abuts on the inboard surface 3a of the left front pillar 3. Then, the fastening bolt 20 is inserted through the fastener hole 14 formed in the inner and outer panels 6 and 7, and screwed and tightened into the internally threaded portion 17α of the adjust nut 17', as shown in FIG. 16. The adjust nut 17' shown in FIGS. 15 and 16 has lever arms 19 like the conventional adjust nut 17 shown in FIGS. 18 and 19. In the eighth example, however, it is possible to omit these lever arms 19.

The present invention is applicable more widely to such a structure having a cross member fastened between left and right side members. In some vehicle bodies, the steering member is fastened between dash side panels below and in front of the front pillars. The present invention is applicable to this type of vehicle body. In this case, each of the left and right side assemblies comprises the dash side panel.

What is claimed is:

1. A steering member mounting structure for a vehicle, comprising:
    a first side assembly comprising a first front pillar, and a second side assembly comprising a second front pillar, said second side assembly being formed with a fastener hole;
    a steering member extending in a widthwise direction of the vehicle between said first and second side assemblies, and comprising a first end fixed to said first side assembly and a second end fixed to said second side assembly;
    a screw fastener for fastening said second end of said steering member to said second side assembly, said screw fastener passing through said fastener hole of said second side assembly; and
    an adjusting means comprising a stationary adjusting screw member fixed to said second end of said steering member, and a movable adjusting screw member which forms a bolted joint with said stationary adjusting screw member and which comprises an engagement hole confronting said fastener hole of said second side assembly, one of said stationary adjusting screw member and movable adjusting screw member comprising an internal threaded hole into which said screw fastener is screwed;
    wherein said stationary adjusting screw member is an adjusting bolt which comprises an externally threaded portion and said internally threaded hole; said movable adjusting screw member is an adjusting nut which comprises an internally threaded portion engaging with said externally threaded portion of said adjusting bolt, and a portion defining said engagement hole; and said screw fastener is a bolt comprising a shank which passes through said engagement hole and which comprises a threaded portion screwed into said internally threaded hole of said adjusting bolt; and
    wherein said engagement hole formed in said adjusting nut is noncircular.

2. A structure according to claim 1 wherein said engagement hole has a cross sectional shape of a regular polygon which is circumscribed by an imaginary outer circle having an outer diameter, and inscribed by an imaginary inner circle which is concentric with said outer circle and which has an inner diameter smaller than said outer diameter, said fastener hole of said second side assembly is a circular hole whose diameter is equal to or greater than said outer diameter, and an outside diameter of said shank of said screw fastener is equal to or smaller than said inner diameter.

3. A structure according to claim 2 wherein said screw fastener further comprises a head, and said second front pillar comprises a mount portion which defines said fastener hole and which is clamped between said head of said screw fastener and said adjusting nut.

4. A structure according to claim 1 wherein said adjusting nut further comprises an externally threaded portion, and said structure further comprises a fixed nut which is fixed to said second front pillar and which comprises a through hole through which said shank of said screw fastener passes and an internally threaded portion into which said externally threaded portion of said adjusting nut is screwed.

5. A structure for a vehicle, comprising;
    a first side assembly comprising a first mount portion, and a second side assembly comprising a second mount portion which is formed with a fastener hole; and
    an adjustable cross assembly which extends from a first end to a second end along a lateral direction of the vehicle, said first end of said adjustable cross assembly being fixed to said first mount portion of said first side assembly, said second end of said cross assembly comprising an internally threaded hole and being fastened to said second mount portion of said second side assembly by a screw fastener which is inserted through said fastener hole of said second mount portion and screwed into said internally threaded hole of said cross assembly; said adjustable cross assembly comprising a cross member comprising a first end defining said first end of said adjustable cross assembly and a second end which confronts said second side assembly and which comprises a threaded adjusting portion, and a movable adjusting screw member for adjusting a length of said adjustable cross assembly between said first and second ends of said adjustable cross assembly, said movable adjusting screw member comprising a threaded adjusting portion engaging with said threaded adjusting portion of said cross member so as to form a bolted joint, and a noncircular engagement socket defining a noncircular engagement hole through which said screw fastener passes.

6. A structure according to claim 5 wherein said first side assembly comprises a first front pillar, said second side assembly comprises a second front pillar, and said cross member comprises a steering member extending from a first end defining said first end of said cross member to a second end along the lateral direction of the vehicle, and wherein one of said threaded adjusting portions of said cross member and said movable adjusting screw member is internally threaded, and the other is externally threaded.

7. A structure according to claim 6 wherein said cross member further comprises a stationary adjusting screw member which is fixed to said second end of said steering member and which defines said second end of said cross member, said stationary adjusting screw member comprises said threaded adjusting portion of said cross member, and said internally threaded hole of said second end of said adjustable cross assembly being formed in one of said stationary screw member and said movable adjusting screw member.

8. A structure according to claim 7 wherein said stationary adjusting screw member comprises an inner portion defining said internally threaded hole into which said screw fastener is screwed, and an outer portion defining said threaded adjusting portion which is formed with an external thread, and said movable adjusting screw member comprises a hollow portion which comprises said threaded adjusting portion which is formed with an internal thread so that said hollow portion is screwed over said threaded adjusting portion of said stationary adjusting screw member, and said movable adjusting screw member further comprises an end portion formed with said engagement hole which is noncircular in cross section.

9. A structure according to claim 8 wherein said screw fastener comprises a head, said second front pillar comprises an outer pillar panel and an inner pillar panel which comprises said second mount portion formed with said fastener hole, said second mount portion is clamped between said head of said screw fastener and said movable adjusting screw member, and said engagement hole has a polygonal cross section.

10. A structure according to claim 9 wherein said second side assembly comprises a fixed nut which is fixed to said second mount portion, and which comprises a through hole through which said shank of said screw fastener passes, and an internally threaded portion, and said movable adjusting screw member comprises an externally threaded portion screwed into said internally threaded portion of said fixed nut.

11. A structure according to claim 6 wherein said second end of said steering ,member comprises said threaded adjusting portion of said cross member, said threaded adjusting portion of said cross member is formed with an external thread, and said threaded adjusting portion of said movable adjusting screw member is formed with an internal thread and screwed over said threaded adjusting portion of said steering member, and said internally threaded hole is formed in said movable adjusting screw member.

\* \* \* \* \*